July 3, 1956

S. DI RENZO 2,753,270

DEVICES FOR INDICATING EXPOSURE OF FROZEN
FOODS TO UNSAFE TEMPERATURES

Filed July 28, 1953

*INVENTOR.*
SIMON DI RENZO
BY
ATTORNEY

United States Patent Office 2,753,270
Patented July 3, 1956

2,753,270

DEVICES FOR INDICATING EXPOSURE OF FROZEN FOODS TO UNSAFE TEMPERATURES

Simon Di Renzo, Philadelphia, Pa., assignor of one-half to John J. McDevitt, Feasterville, Pa.

Application July 28, 1953, Serial No. 370,812

4 Claims. (Cl. 99—192)

This invention relates to devices for indicating exposure of frozen foods to unsafe temperatures and more particularly to such devices formed into and made a part of the package in which the food is stored.

Frozen foods are being used to an increasing extent throughout the country and while the original processors take care that the food is properly selected, packed and processed by freezing, the packages soon pass beyond the control of the original processors. In the subsequent distribution of the frozen food packages, due to mechanical breakdowns, carelessness and other causes, and before the packages of frozen food reach the user it is quite possible that the frozen food has been exposed to thawing temperatures for an excessive length of time so as to become partially or wholly thawed.

The thawing of frozen foods not only produces changes in flavor and texture which are not cured by refreezing but also permits an increase in the bacteria count and even possible spoilage with attendant danger of food poisoning of the users.

The safe upper temperature limits of various frozen foods vary dependent upon the nature and type of the food.

Various proposals have heretofore been made of indicators which show that a frozen food package has been thawed but these are not readily adaptable for adjustment or selection of the upper safe temperature limit for specific foods, or they have other objectionable features. It has been proposed to release a coloring material but this may discolor other packages which have not been thawed and thus reduce their marketability.

It is the principal object of the present invention to provide a conspicuous indicator for use on each package of frozen food to indicate that the package has been exposed to unsafe temperatures for an excessive length of time, which is simple in construction, may be readily observed and interpreted by any consumer or user and which is free from likelihood of failure in use.

It is a further object of the present invention to provide an indicator of the character aforesaid which cannot be reset by refreezing of the package.

It is a further object of the present invention to provide an indicator of the character aforesaid which is low in cost so as not to add appreciably to the cost of the package and which may be quickly and easily applied.

Other objects and advantageous features of the invention will be apparent from the specification and claims.

The nature and characteristic features of the invention will be more readily understood from the following description, taken in connection with the accompanying drawings forming part thereof, in which.

It should, of course, be understood that the description and drawings herein are illustrative merely, and that various modifications and changes may be made in the structure disclosed without departing from the spirit of the invention.

Like numerals refer to like parts throughout the several views.

Figure 2:
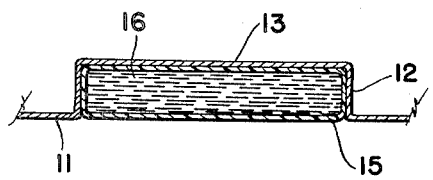
Fig. 2 is a fragmentary sectional view, enlarged, taken approximately on the line 2—2 of Fig. 1.
Figure 3:
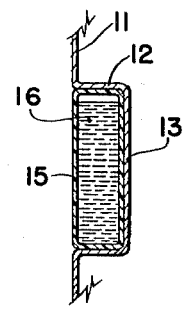
Fig. 3 is a sectional view taken approximately on the line 3—3 of Fig. 2.

Referring now more particularly to the drawings, the outside box or cover of a frozen food package is shown at 10, having a side wall 11. The side wall 11, as particularly shown in Figs. 2 and 3, preferably has a recessed portion 12 inwardly disposed and with a back wall section 13 having a legend 14, such as the word "UNSAFE" printed thereon. The recessed portion 12 preferably has a capsule 15 inserted therein and held in position in any suitable manner, such as by snug engagement in the recessed portion 12. The capsule 15 is composed of an outer wall preferably of transparent plastic material such as synthetic rubber of the neoprene or chloroprene type, vinyl or the like. The interior of the capsule 15 is preferably filled with a low boiling point liquid 16 of non-toxic character having a boiling point close to the range of temperature considered as the safe limit for the particular frozen food enclosed in the package.

The capsule 15 is, of course, filled in any desired manner such as by a thin needle injection through the membrane wall with the hole for filling sealed in any preferred manner such as by a small dab of cement, or by quick local application of heat for sealing. The filling material 16 is preferably colored so as to be as opaque as possible to block any view from the capsule walls of the imprinted legend 14 on the wall section 13.

One suitable class of liquid materials for the filling 16 preferably consists of a fluorinated hydrocarbon compound of a relatively low molecular weight or blends of such compounds to obtain the desired vapor pressure characteristics. The following may be employed:

Dichlorodifluoromethane, $CCl_2F_2$, available under the trade name of Freon–12 from E. I. du Pont de Nemours & Co.

$CCl_2F_2$ is a non-toxic, non-flammable compound having a boiling point of $-21.6°$ F. at atmospheric pressure, and developing, in the range of 0°–30° F., gage pressures of 8–28 pounds per square inch.

Octofluorocyclobutane, $C_4F_8$, available under the trade name of Freon–C318 from E. I. du Pont de Nemours & Co. $C_4F_8$ is a non-toxic, nonflammable compound having a boiling point of about 21° F. at atmospheric pressure, and developing, in the range of 21°–30° F., gauge pressures of 0–3 pounds per square inch.

Monochloropentafluoroethane, $CClF_2CF_3$, available under the trade name of Freon–115 from E. I. du Pont de Nemours & Co. $CClF_2CF_3$ is a non-toxic, nonflammable compound having a boiling point of $-37.7°$ F. at atmospheric pressure, and developing, in the range of 0°–30° F. gauge pressure of 19–48 pounds per square inch.

Monochlorodifluoromethane $CHClF_2$, available under the trade name of Freon–22 from E. I. du Pont de Nemours & Co. $CHClF_2$ is a non-toxic, nonflammable compound having a boiling point of $-41.4°$ F. at atmospheric pressure, and developing, in the range of 0–30° F., gauge pressure of 24–55 pounds per square inch.

Other members of the Freon family, such as Freon–21 and Freon–114, among others, may be used if desired. It is possible to use the suitable individual compounds listed above or to blend suitable members to obtain the vapor pressure characteristics necessary.

Unsafe temperatures for frozen foods vary depending on the type of food concerned, assuming all other factors, such as processing and packaging, remain constant and satisfactory, and these temperatures may be as low as 10° F. and frequently are 20–30° F. or below. Therefore, for a capsule 15 of known bursting strength characteristics an individual filling compound or a suitable blend of filling compounds can be provided of the desired vapor pressure characteristics. The opposite approach can be used, if desired, in that the capsule material can be prepared having the desired bursting strength qualities by choosing a suitable material preferably from the ones previously mentioned, and preparing a capsule of predetermined wall thickness so that wall rupture will occur as desired. The capsule 15 may be provided having a wall thickness with a bursting strength in excess of the predetermined amount and a relatively small area of calculated reduced thickness to burst at the desired temperature. With such an arrangement the bursting direction may be controlled and the indicator is more easily set for the desired bursting effect.

Figure 1:
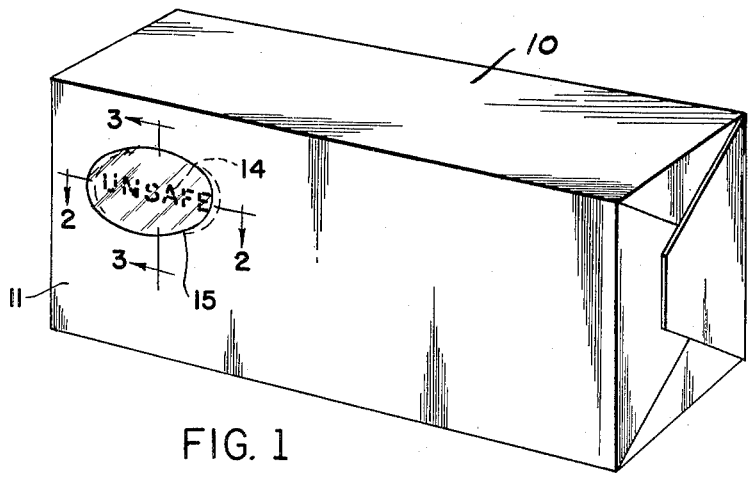
Figure 1 is a view in perspective of a package having the indicator of the present invention applied thereto.

It will be noted from Fig. 1 that the indicating legend 14, such as "Unsafe" is positioned behind the capsule 15. The fluid confined in the capsule 15 is colored and rendered substantially opaque by any of the known suitable non-toxic dyes, preferably of an attractive color such as red or blue. Hence, when the capsule, with opacified confined fluid is intact the indicating word will be concealed from the observer. After an unsafe temperature has been reached and maintained for an unsafe time the capsule 15 will erupt, disgorging its contents and revealing the indicating legend 14. For the action to occur satisfactorily, it is not necessary for the capsule 15 to shatter completely.

The capsule 15 may be made of any of the suitable materials previously set forth. If complete rupture of the capsule is contemplated any of the suitable materials is satisfactory. However, if the small thin-walled section is employed then the capsule wall material should be substantially transparent so that once the opaque fluid has fled the indicating word will be viewable.

Figure 4:
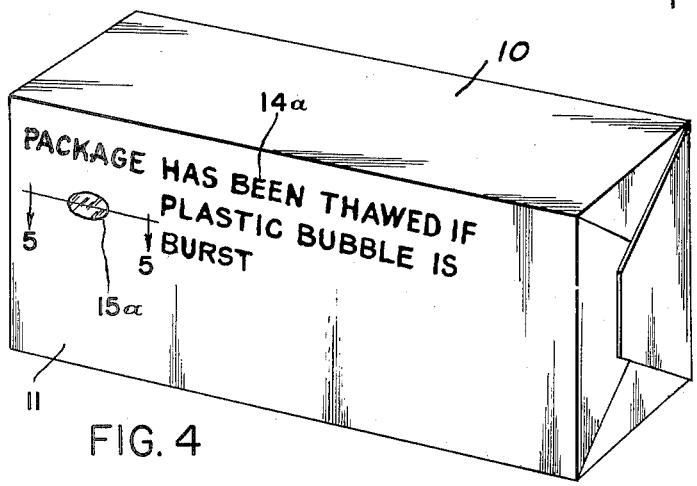
Fig. 4 is a view in perspective of another package having the indicator of the present invention applied thereto.
Figure 5:
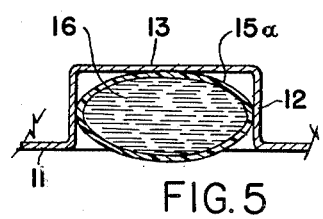
Fig. 5 is a fragmentary sectional view, enlarged, taken approximately on the line 5—5 of Fig. 4.

If desired and as illustrated in Figs. 4 and 5 a smaller capsule 15a preferably of a diameter of the order of ⅛ inch may be employed. In such an instance the capsule 15a is preferably brightly colored such as yellow, red, green or blue. Instead of an indicating word behind the capsule, which in this case would be too small to read, an accompanying legend 14a is printed on the frozen food container to inform the observer that if the capsule 15a is broken the container 10 has been exposed for an excessive time period to unsafe temperatures.

The amount of time that the capsule 15 or 15a can be exposed to unsafe temperatures before bursting occurs will be controlled by the amount and characteristics of the fluid 16 introduced into the capsule 15 or 15a and the type and wall dimensions of the plastic used. As has been previously stated the unsafe range may vary somewhat within the vast variety of foods packaged. This is well known, and either a variety of capsule bursting ranges may be provided or, if desired, a standard capsule prepared calculated to burst at the lowest unsafe temperature.

It can be readily seen that the bursting process is irreversible, and, hence, once the frozen food has been exposed to unsafe temperatures for an unsafe amount of time a quick inspection will reveal it. Thus a desirable indication is provided as to the character of handling of frozen food products from the time of processing to the time of final sale.

I claim:

1. An indicator for frozen food containers comprising a container, a capsule positioned on said container in a visible location, a non-toxic fluid polyhalogenated hydrocarbon sealed within said capsule, said fluid having vapor pressure characteristics to cause bursting of said capsule at a predetermined temperature level in the range below 30° F.

2. An indicator for frozen food containers comprising a container, a capsule positioned on said container in a visible location, a non-toxic fluid polyhalogenated hydrocarbon sealed within said capsule, said fluid having vapor pressure characteristics to cause bursting of said capsule at a predetermined temperature level in the range between 10° and 30° F.

3. An indicator for frozen food containers comprising a frangible capsule of plastic material having sealed therein a non-toxic polyhalogenated hydrocarbon having vapor pressure characteristics to cause bursting of said capsule at a selected temperature in the range between 10° and 30° F.

4. An indicator for frozen food containers comprising a frangible capsule of plastic material having sealed therein a non-toxic polyhalogenated hydrocarbon having vapor pressure characteristics to cause bursting of said capsule at a selected temperature below 30° F.

References Cited in the file of this patent

UNITED STATES PATENTS

| | | |
|---|---|---|
| 2,460,215 | Chase | Jan. 25, 1949 |
| 2,548,382 | Lovelace | Apr. 10, 1951 |
| 2,662,018 | Smith | Dec. 8, 1953 |